Patented Sept. 18, 1951

2,568,037

UNITED STATES PATENT OFFICE 2,568,037

TERTIARY-AMINOALKYL ESTERS AND AMIDES OF 4-QUINOLYLMERCAPTO-ALKANOIC ACIDS AND THEIR PREPARATION

Alexander R. Surrey, Albany, N. Y., assignor to Sterling Drug Inc., Wilmington, Del., a corporation of Delaware No Drawing. Application October 24, 1947, Serial No. 782,015

20 Claims. (Cl. 260—247.1)

This invention relates to tertiary-aminoalkyl esters and amides of 4-quinolylmercaptoalkanoic acids and their preparation, to salts of said esters and amides, and to methods of preparing such compounds.

My new compounds have the general formula

Q—S—X—CO—Z—B where Q is a 4-quinolyl radical, X is a lower alkylene radical, Z is O, NH, or N-(lower alkyl), and B is a lower tertiary-aminoalkyl group. These compounds are useful as medicinal agents.

In the above general formula when Z is N-(lower alkyl), said lower alkyl may be methyl, ethyl, n-propyl, isopropyl, n-butyl, n-amyl, or the like. The lower alkylene radical, designated as X, includes such groups as methylene, ethylene, trimethylene, 1,1-ethylene, 1,2-propylene, 2,2-propylene, 2,2-dimethyl-1,3-propylene, or the like. The tertiary-aminoalkyl radical, designated as B, includes such groups as: 2-diethylaminoethyl; 3-dimethylaminopropyl; 2-(1-piperidyl)-ethyl; 4-(4-morpholinyl)butyl; 5-diethylamino-2-pentyl; 5-dimethylamino-pentyl; 2-(2-methyl-1-pyrrolidyl)ethyl; 2-di-n-butylaminoethyl; 3-(2-methyl-1-piperidyl)propyl; and the like.

It is to be understood that the term "a 4-quinolyl radical" as used in this specification and in the appended claims is generic, and includes 4-quinolyl radicals wherein the quinoline nucleus may be substituted by one or more of such groups as: halo, including chloro, bromo, iodo, and fluoro; lower alkyl, including methyl, ethyl, propyl, amyl, etc.; hydroxy; lower alkoxy, including methoxy, ethoxy, propoxy, etc.; aryloxy, such as phenoxy; aralkoxy, such as benzyloxy; trihaloalkyl, such as trifluoromethyl; nitro; amino; substituted amino, such as acetylamino, ethylamino, dimethylamino, benzylamino, etc.; and other substituents.

The following compounds are representative of the basic esters and amides of my invention:

1. 2-(2-methyl-1-pyrrolidyl)ethyl 4-(7-chloro-4-quinolylmercapto)butanoate.

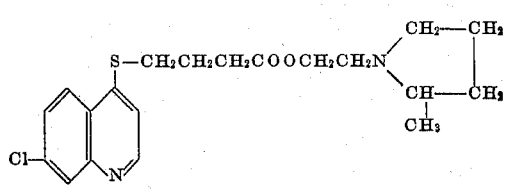

2. 4-diethylaminobutyl 8-bromo-3-methyl-4-quinolylmercaptoacetate.

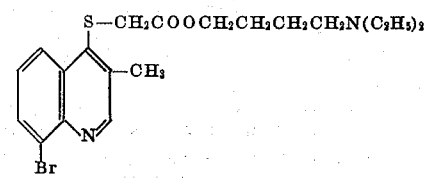

3. 3 - (4 - morpholinyl)propyl 2 - (6-ethoxy-3-methyl-4-quinolylmercapto)propanoate.

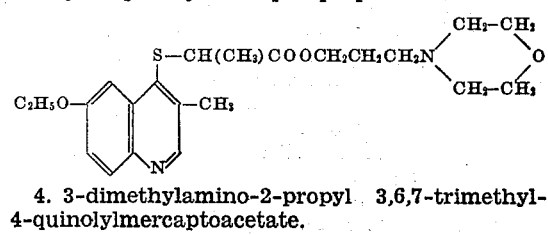

4. 3-dimethylamino-2-propyl 3,6,7-trimethyl-4-quinolylmercaptoacetate.

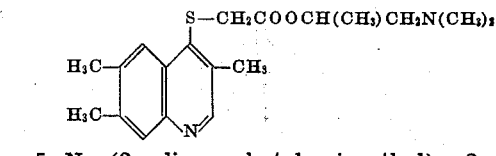

5. N - (2 - di - n - butylaminoethyl) - 2 - (7 - phenoxy - 4 - quinolylmercapto)butanamide.

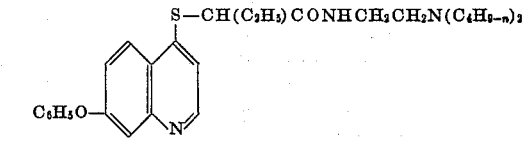

6. N - (3 - (1 - piperidyl)propyl) - 3 - (7 - chloro - 3 - nitro - 4 - quinolylmercapto)propanamide.

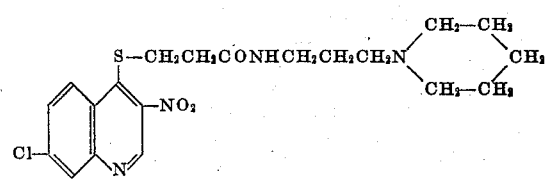

7. N - (2 - diethylaminoethyl) - (3,7 - dichloro-4-quinolylmercapto)acetamide.

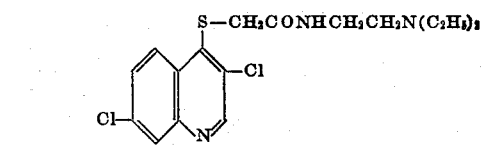

8. N - (2 - diethylaminoethyl) - N - methyl - (8 - ethoxy - 3 - methyl - 4 - quinolylmercapto) - acetamide.

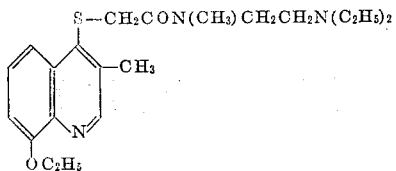

Either 4-haloquinolines or 4-quinolinethiols may be used as starting materials for the preparation of my new compounds. Treatment of a 4-haloquinoline with a mercaptoalkanoic acid or treatment of a 4-quinolinethiol with a haloalkanoic acid, in either case in the presence of a base, results in the formation of a 4-quinolylmercaptoalkanoic acid. When esters of the halo- or mercapto-acids are used, the corresponding quinolylmercaptoalkanoic esters are obtained. Thus, by treating 4,7-dichloroquinoline with mercaptoacetic acid, 7-chloro-4-quinolylmercaptoacetic acid is obtained; and by treating 7-chloro-4-quinolinethiol with ethyl 2-bromopropanoate, ethyl 2-(7-chloro-4-quinolylmercapto) propanoate is formed.

The intermediate 4-haloquinolines are a generally well known group of compounds. Representative examples of those that can be used in the synthesis of my basic esters and amides are listed as follows:

3,4-dichloroquinoline
3,4,5-trichloroquinoline
3,4,7-trichloroquinoline
3-bromo-4-chloroquinoline
3-bromo-4,7-dichloroquinoline
3-iodo-4-chloroquinoline
3-iodo-4,5-dichloroquinoline
4,5,6-trichloroquinoline
4,5,7-trichloroquinoline
4,6,8-trichloroquinoline
4,7,8-trichloroquinoline
4-chloro-5,7-dibromoquinoline
3-methyl-4-chloro-7-iodoquinoline
3-methyl-4-chloro-8-iodoquinoline
3-methyl-4,5-dichloroquinoline
3-methyl-4,7-dichloroquinoline
3-methyl-4-chloro-7-bromoquinoline
3-methyl-4-chloro-6-bromoquinoline
3-methyl-4-chloro-6-ethoxyquinoline
3,6-dimethyl-4-chloroquinoline
3-methyl-4,8-dichloroquinoline
6-methyl-4-chloro-8-methoxyquinoline
3,8-dimethyl-4-chloroquinoline
4,7-dichloroquinoline
4-chloro-7-bromoquinoline
4-chloro-7-iodoquinoline
4,7-dichloro-6-methoxyquinoline
4,5-dichloroquinoline
3-nitro-4-chloroquinoline
3-amino-4-chloroquinoline
4-chloro-7-fluoroquinoline
4-chloro-7-trifluoromethylquinoline
4,7-dichloro-5-methoxyquinoline
4-chloro-7-phenoxyquinoline
3,4-dibromoquinoline
4-chloro-6-nitroquinoline The above 4-haloquinolines, as well as others, have been described in the literature (see Surrey et al., J. Am. Chem. Soc. 68, 113, 1244, and 2570 (1946); Steck et al., ibid. 129, 132, 380, and 1241 (1946); Riegel et al., ibid. 1229; Baker et al., ibid. 1267; Mosher et al., ibid. 69, 303 (1947); Bachman et al., ibid. 365; Snyder et al., ibid. 371; and Clinton et al. ibid. 704).

The intermediate 4-quinolinethiols are a generally known group of compounds. A convenient way to prepare this type of thiol is to treat the corresponding 4-haloquinoline with thiourea to yield a quinolylthiouronium halide which on treatment with alkali yields the desired 4-quinoline thiol.

The new basic esters and amides of the above general formula can be prepared by a variety of methods. However the method preferred in practicing my invention comprises treating a lower alkyl 4-quinolylmercaptoalkanoate with a tertiary-aminoalkanol or a tertiary-aminoalkylamine to yield the corresponding basic ester or amide, respectively. For example, 2-diethylaminoethyl 2-(7-chloro-4-quinolylmercapto) propanoate is obtained when a mixture of methyl 2-(7-chloro-4-quinolyl) mercaptopropanoate and an excess of 2-diethylaminoethanol in a petroleum ether fraction comprising mixed octanes is refluxed for about six to twelve hours or until the reaction is complete as judged, for instance, by cessation of alcohol formation. Similarly, N-(4-dimethylaminobutyl)-(6-methoxy-4-quinolylmercapto) acetamide is obtained from methyl 6-methoxy-4-quinolylmercaptoacetate and 4-dimethylaminobutylamine.

The basic esters of my invention also can be prepared by heating a tertiary-aminoalkyl halide with the appropriate 4-quinolylmercaptoalkanoic acid suspended in an aliphatic alcohol such as ethanol, isopropanol, and the like. Thus, treatment of 5-chloro-4-quinolylmercaptoacetic acid with 2-diethylaminoethyl chloride in such a manner yields 2-diethylaminoethyl 5-chloro-4-quinolylmercaptoacetate.

In addition, the amides of my invention can be prepared by treating a 4-haloquinoline with the sodium salt of an N-(tertiary-aminoalkyl) mercaptoalkanamide; for example, N-(2-diethylaminoethyl)-(7-chloro-4-quinolylmercapto) acetamide is formed from 4,7-dichloroquinoline and the sodium salt of N-(2-diethylaminoethyl)-mercaptoacetamide. N-(tertiaryaminoalkyl) mercaptoalkanamides can be readily obtained by the reaction of a tertiary-aminoalkylamine with a lower alkyl mercaptoalkanoate; for example, N-(2-diethylaminoethyl) mercaptoacetamide, mentioned above, is obtained from 2-diethylaminoethylamine and ethyl mercaptoacetate.

Another mode of synthesizing the basic esters and amides of my invention is afforded by treating a 4-quinolylmercaptoalkanoyl halide with a tertiary-aminoalkanol or a tertiary-aminoalkylamine, respectively. Thus, 2-diethylaminoethyl 7-chloro-4-quinolylmercaptoacetate or N-(2-diethylaminoethyl)-7-chloro-4-quinolylmercaptoacetamide is obtained by treating 7-chloro-4-quinolylmercaptoacetyl chloride with 2-diethylaminoethanol or 2-diethylaminoethylamine, respectively.

The basic esters and amides of my invention have the same properties, as pharmaceuticals, whether employed as the free bases, which are the active compounds, or—and often more conveniently—as their salts with non-toxic inorganic or organic acids; so it will be understood that the free bases and their salts are equivalents with respect to the instant invention. Among the acids which may be employed to form the salts are hydrochloric, phosphoric, sulfuric, sulfamic, tartaric, citric, benzoic, and the like.

Also comprehended by my invention are the intermediate quinolylmercaptoalkanoic acids, simple derivatives thereof, e. g. lower alkyl esters, amides, and methods of preparing the same.

Further, it is to be understood that, while the invention is described in the following examples with particular reference to specific embodiments, it is not to be limited thereto, but rather is defined by the appended claims.

EXAMPLE 1

A. *7-chloro-4-quinolinethiol.*—To a warm solution of 19.8 g. of 4,7-dichloroquinoline in 200 ml. of absolute alcohol is added 7.6 g. of thiourea. After the resulting solution has been shaken for a few minutes, the entire contents of the flask solidify. The white solid is collected and dissolved in water. The resulting solution is made alkaline with sodium carbonate whereupon a yellow-orange solid separates. This solid is dissolved in dilute sodium hydroxide solution and the solution filtered. The small amount of solid that is removed at this stage is the byproduct, bis(7-chloro-4-quinolyl)sulfide, which melts 166–7° C. after recrystallization from pyridine. The alkaline filtrate is acidified with acetic acid to give the yellow product, 7-chloro-4-quinolinethiol, which, after recrystallization from acetic acid, melts at 196–7° C.

B. *2-(7 - chloro-4-quinolylmercapto) propanoic acid.*—A mixture of 19.5 g. of 7-chloro-4-quinolinethiol, 8 ml. of 35% sodium hydroxide, 200 ml. of ethanol, and 18.1 g. of ethyl 2-bromopropanoate is refluxed with stirring for six hours. The alcohol is removed by distillation, and the resulting ester is hydrolyzed by heating with dilute sodium hydroxide solution. The acid is precipitated with hydrochloric acid, dissolved in a dilute solution of sodium bicarbonate, and reprecipitated with acetic acid. The purified product, 2-(7-chloro-4 - quinolylmercapto)propanoic acid, after recrystallization from ethanol, melts at 202–4° C. The methyl ester hydrochloride, prepared by treating this acid with methanol in the presence of concentrated sulfuric acid, isolating the resulting ester, and treating the ester with methanol saturated with hydrogen chloride, melts at 167–8° C. after recrystallization from isopropanol.

Other compounds prepared by the above procedure include: 3-(7-chloro-4-quinolylmercapto)propanoate (from 3-chloropropanoic acid), M. P. 212–4° C., and methyl ester thereof, M. P. 84.5–86° C.; 7-chloro-4 - quinolylmercaptoacetic acid (from chloroacetic acid), M. P. 228–9° C. with decomposition, and methyl ester thereof, M. P. 99.5–100.5° C.

These 4-quinolylmercaptoalkanoic acids also can be prepared by reacting the appropriate 4-haloquinoline with a mercaptoalkanoic acid in the manner described in the following preparation of 7-chloro-4-quinolylmercaptoacetic acid: A mixture of 19.8 g. of 4,7-dichloroquinoline, 11 g. of mercaptoacetic acid, and 50 ml. of pyridine is refluxed for three hours, and then made alkaline with sodium hydroxide solution. After removal of the pyridine by steam distillation, the residual alkaline solution is acidified with acetic acid. The resulting precipitate is collected, and heated on a steam bath with alcohol to leach out impurities. It is then further purified by dissolution in dilute sodium bicarbonate solution followed by precipitation with acetic acid. A mixed melting point determination of this product, 7-chloro-4-quinolylmercaptoacetic acid, with the acid prepared by the previously described method (from 7-chloro-4-quinolinethiol and chloroacetic acid) shows no depression. Similarly, the methyl esters prepared from both acids are identical. The ethyl ester melts at 60–1° C. and the amide prepared by treating the methyl ester with alcoholic ammonia at room temperature, melts at 213–4° C.

Other acids, and simple alkyl esters thereof, prepared by this procedure, i. e. from a 4-haloquinoline and a mercaptoalkanoic acid, include those represented by the following formula:

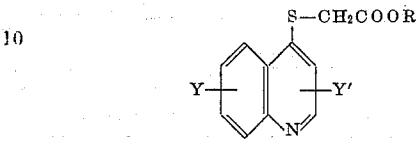

where Y, Y′, and R have the meanings given in the following table:

*Table I*

| Y | Y′ | R=H, M.P./C.° | R=CH$_3$, M.P./C.° |
|---|---|---|---|
| 5-Cl | H | 221–2 | 102.5–3.5 |
| H | H | 233–4 | [1] 192–3 |
| 6-OCH$_3$ | H | 236–7 | 82.5–3.5 |
| 7-Cl | 3-CH$_3$ | 186–8 | 77–8 |
| H | 3-CH$_3$ | 179–81 | 62–3 |
| 8-OC$_2$H$_5$ | 3-CH$_3$ | 198–9 | 81–2 |
| 6-Br | 3-CH$_3$ | 197–9 | 76.5–7 |
| 8-CH$_3$ | 3-CH$_3$ | 170–2 | 55–6 |
| 7-Cl | 2-CH$_3$ | 229–30 | 102–4 |
| 7-Cl | 3-Br | 202–4 | 76–8 |
| 5-Cl | 3-CH$_3$ | 189–90 | |
| 6-OCH$_3$ | 3-CH$_3$ | 192–4 | 57–8 |
| 8-OCH$_3$ | 3-CH$_3$ | 178–80 | 81.5–2 |

[1] Melting point of hydrochloride.

The above acids are purified by recrystallization, e. g. from ethanol, or by reprecipitation from an alkaline solution using an acid such as acetic acid. The corresponding esters are readily purified generally by recrystallization from nonpolar solvents such as petroleum ether, benzene, etc., and in some instances e. g. with methyl 6-bromo-3-methyl-4-quinolylmercaptoacetate, polar solvents such as methanol can be used.

C. *2-diethylaminoethyl 2-(7-chloro-4-quinolylmercapto) propanoate dihydrochloride.*— A mixture of one mole of methyl 2-(7-chloro-4-quinolylmercapto)propanoate and four moles of 2-diethylaminoethanol dissolved in a petroleum ether fraction comprising mixed octanes is refluxed in a flask adapted with a water separator for about six to twelve hours or until no more methanol separates. The rate of reflux is maintained at such a rate that practically no petroleum ether is collected with the methanol.

The petroleum ether is removed by distillation under reduced pressure, the crude residue is dissolved in ether, and the ethereal solution is washed thoroughly with water. After removal of the ether by distillation, the residue is dissolved in about ten volumes of acetone, the solution is filtered with charcoal, and to the filtrate is added a slight excess of alcoholic-hydrogen chloride. If necessary, ether is added to precipitate the hydrochloride. The product, 2-diethylaminoethyl 2-(7-chloro-4-quinolylmercapto) propanoate dihydrochloride, after recrystallization from ethanol, melts at 199–201° C. and has the formula,

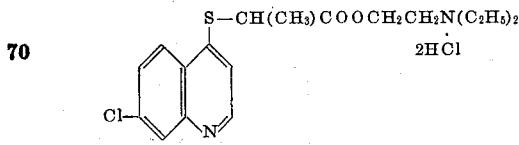

Other compounds which can be prepared by the above procedure include those represented by the following formula:

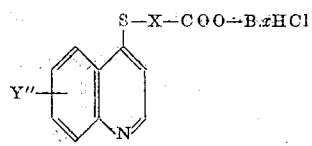

where Y″, X, B, and $x$ have the meanings given in Table II:

Table II

| Y″ | X | B | $x$ | M.P./C.° |
|---|---|---|---|---|
| 7-Cl | CH$_2$CH$_2$ | CH$_2$CH$_2$N(C$_2$H$_5$)$_2$ | 2 | 175–6.5 |
| 7-Cl | CH$_2$ | CH$_2$CH$_2$CH$_2$N(C$_2$H$_5$)$_2$ | 1 | 157.5–8.5 |
| H | CH$_2$ | CH$_2$CH$_2$N(C$_2$H$_5$)$_2$ | 2 | 154–5 |
| 5-Cl | CH$_2$ | CH$_2$CH$_2$N(CH$_3$)$_2$ | 1 | 180–1 |
| 5-Cl | CH$_2$ | CH$_2$CH$_2$NC$_5$H$_{10}$[a] | 2 | 179–80 |
| 5-Cl | CH$_2$ | CH$_2$CH$_2$NC$_4$H$_8$O[b] | 2 | 214–5 |
| 7-Cl | CH$_2$ | CH$_2$CH$_2$N(CH$_3$)$_2$ | 1 | 170–2 |
| 7-Cl | CH$_2$ | CH$_2$CH$_2$N(C$_2$H$_5$)$_2$ | 1 | 145–6 |
| 7-Cl | CH$_2$ | CH$_2$CH$_2$NC$_5$H$_{10}$[a] | 1 | 165–6 |
| 7-Cl | CH$_2$ | CH$_2$CH$_2$NC$_4$H$_8$O[b] | 2 | 199–201 |
| 6-OCH$_3$ | CH$_2$ | CH$_2$CH$_2$N(C$_2$H$_5$)$_2$ | 1 | 154–5 |

[a] NC$_5$H$_{10}$ is 1-piperidyl.
[b] NC$_4$H$_8$O is 4-morpholinyl.

In addition, other basic esters can be prepared using the intermediate esters shown in Table I as well as other related alkyl quinolylmercaptoalkanoates. Such basic esters include the following: 3-diethylaminopropyl 3-bromo-7-chloro-4-quinolylmercaptoacetate, 4-dimethylaminobutyl 6-methoxy-3-methyl-4-quinolylmercaptoacetate, 3-(2-methyl-1-piperidyl)propyl 3-(7-chloro-2-methyl-4-quinolylmercapto)butanoate, and the like.

EXAMPLE 2

*2 - diethylaminoethyl 5-chloro-4-quinolylmercaptoacetate hydrochloride.*—To a hot suspension of 12.7 g. of 5-chloro-4-quinolylmercaptoacetic acid in 60 ml. of dry isopropanol is added 6.8 g. of 2-diethylaminoethyl chloride. After stirring for about fifteen minutes, a clear solution is obtained; after about twenty minutes the contents of the flask solidify. The solid is collected and purified by several recrystallizations from ethanol. This product, 2-diethylaminoethyl 5-chloro-4-quinolylmercaptoacetate hydrochloride, melts at 199–201° C. and has the formula

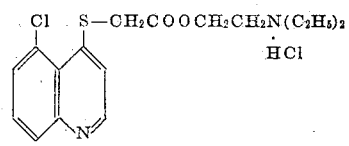

EXAMPLE 3

A. *N-(2-diethylaminoethyl)-7-chloro-4-quinolylmercaptoacetamide hydrochloride.*—This preparation is carried out like that described in Example 1—C, except that 26.8 g. of methyl 7-chloro-4-quinolylmercaptoacetate and 18 g. of 2-diethylaminoethylamine are used. The product, N-2-diethylaminoethyl - 7-chloro - 4-quinolylmercaptoacetamide hydrochloride, after recrystallization from alcohol-acetone-ether, melts at 132–3° C. and has the formula

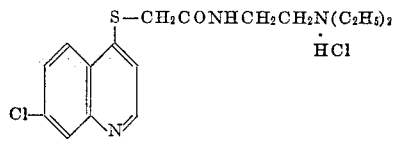

B. *N-(3-diethylaminopropyl)-7-chloro-4-quinolylmercaptoacetamide.*—A mixture of 26.8 g. of methyl 7-chloro-4-quinolylmercaptoacetate, 20 g. of 3-diethylaminopropylamine, and 200 ml. of petroleum ether (mixed octanes' fraction) is refluxed gently for six hours. After removal of the solvent by distillation, the residue becomes semi-solid on standing. This material, when recrystallized several times from n-heptane, melts at 91–2° C.; the purified product is N-(3-diethylaminopropyl)-7-chloro-4 - quinolylmercaptoacetamide of the formula

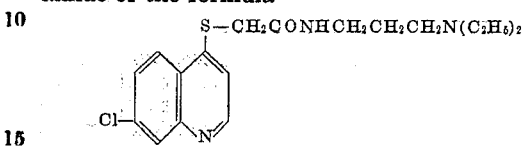

The above procedures can be used in the preparation of related basic amides having the formula

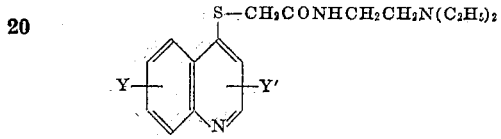

where Y and Y′ have the meanings given in Table III:

Table III:

| Y | Y′ | M.P. of Base/°C.[1] | M.P. of hydrochloride, °C.[2] |
|---|---|---|---|
| 7-Cl | 3-CH$_3$ | | 164–6 |
| H | H | 61–2 | 116–7 |
| 6-OCH$_3$ | H | 54–5 | 161–2 |
| 5-Cl | H | 87–8 | 131–4 |
| H | 3-CH$_3$ | | 132–4 |
| 8-OC$_2$H$_5$ | 3-CH$_3$ | 94–5 | 144.5–6.5 |
| 6-Br | 3-CH$_3$ | | 171–3 |
| 8-CH$_3$ | 3-CH$_3$ | 85–7 | 119–20 |
| 7-Cl | 2-CH$_3$ | 108.5–9.5 | 130–1 |
| 7-Cl | 3-Br | 130–1 | 170–2 |
| 6-OCH$_3$ | 3-CH$_3$ | 78–9 | 138.5–40 |
| 8-OCH$_3$ | 3-CH$_3$ | 102.5–3.5 | 138–9 |

[1] The free bases are recrystallized from petroleum ether or ether-petroleum ether.
[2] The hydrochlorides are recrystallized from an ethanol-acetone-ether combination or from ethanol.

In addition, by using the above general procedures (Example 3A and 3B) the basic amides of my invention are derived from other alkyl quinolylmercaptoalkanoates; such additional basic amides include: N-(2-dimethylaminoethyl)-3-(7-chloro-4-quinolylmercapto)propanamide, N-(5-diethylamino-2-pentyl)-2-(3-bromo-7-chloro-4-quinolylmercapto)butanamide, and the like. Also, di-N-substituted amides are formed when the above procedures are followed but using an N-alkyl-tertiary-aminoalkylamine; for example N-(3-dimethylaminopropyl)-N-ethyl-(7-chloro-4-quinolylmercapto)acetamide is prepared from methyl 7-chloro-4-quinolylmercaptoacetate and N′-ethyl-N,N-dimethyl-1,3-propylenediamine.

EXAMPLE 4

A. *N - (2 - diethylaminoethyl)mercaptoacetamide.*—A solution of 0.30 mole of ethyl mercaptoacetate and 0.60 mole of 2-diethylaminoethylamine in 200 ml. of dry benzene is refluxed for eight hours in a flask adapted with a water separator to remove ethanol formed by the reaction. Removal of the solvent by distillation in vacuo leaves a residue of 43.6 g. of crude N-(2-diethylaminoethyl)mercaptoacetamide which is suitable for use in the next step of synthesis (see Example 4—B).

B. *N - (2 - diethylaminoethyl) - 7 - chloro - 4-quinolylmercaptoacetamide.*—To a solution of 22 g. of crude N-(2-diethylaminoethyl) mercaptoacetamide (from Example 4—A) in 200 ml. of ethanol containing 4 g. of sodium hydroxide is added 20 g. of 4,7-dichloroquinoline, and the resulting mixture is refluxed with stirring for four hours. The solid which separates is filtered, and the filtrate is concentrated in vacuo to give about 13 g. of crude product, which is dissolved in dilute hydrochloric acid and reprecipitated with sodium hydroxide solution. The solid thus obtained is recrystallized from ether to yield the purified product, N-(2-diethylaminoethyl)-7-chloro-4-quinolylmercaptoacetamide, M. P. 98.5–9.5° C. (a mixed melting point with a sample of the base of the hydrochloride prepared according to the procedure described in Example 3 gives no depression).

The procedure described in Examples 4—A and 4—B are suitable for the synthesis of other basic amides of my invention. Thus, these procedures can be carried out using other lower alkyl mercaptoalkanoates, other tertiary-aminoalkylamines, and other 4-haloquinolines; for example, methyl 3-mercaptopropanoate and 3-dimethylaminopropylamine can be reacted according to the procedure of Example 4—A to give N-(3-dimethylaminopropyl)-3-mercaptopropanamide, and then this reacted with 6-methoxy-4-chloroquinoline, as in Example 4—B, to yield N-(3-dimethylaminopropyl) - 3 - (6 - methoxy - 4 - quinolylmercapto)propanamide as the final product.

Application of this mode of preparation to the synthesis of the corresponding basic esters of our invention is not as satisfactory as for the amides since the tertiary-aminoalkyl mercaptoalkanoates, which are formed by substituting a tertiary-aminoalkanol for 2-diethylaminoethylamine in Example 4—A, are partially hydrolyzed under the alkaline reaction conditions of Example 4—B. In contrast, the amides formed by the procedure described in Example 4—A, are rather resistant to hydrolysis under the conditions employed in Example 4—B.

EXAMPLE 5

*Methyl 7-chloro-4-quinolylmercaptoacetate.*— A mixture of 5 g. of 7-chloro-4-quinolylmercaptoacetic acid, 3.4 g. of phosphorous pentachloride, and 100 ml. of dry benzene is refluxed with stirring for about one hour. The benzene is distilled in vacuo; 100 ml. of methanol is added to the residue; and the resulting mixture is refluxed for one hour. After removal of the methanol by distilling in vacuo, the residue is dissolved in water and the resulting solution is made alkaline with aqueous sodium carbonate solution. The solid that separates is collected by filtration and recrystallized from petroleum ether to yield 2.5 g. of methyl 7-chloro-4-quinolylmercaptoacetate, M. P. 98–100° C., having the formula

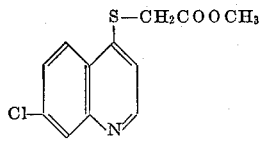

If the above procedure is carried out using in place of methanol either 2-diethylaminoethanol or 2-diethylaminoethylamine there is obtained as the final products 2-diethylaminoethyl 7-chloro-4-quinolylmercaptoacetate and N-(2-diethylaminoethyl) - 7 - chloro - 4 - quinolylmercaptoacetamide, respectively.

I claim:

1. A compound having the formula

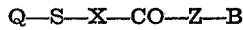

where Q is a 4-quinolyl radical, X is a lower alkylene radical, Z is a member of the group consisting of O, NH, and N-(lower alkyl), and B is a lower tertiary-aminoalkyl group, the tertiary-amino portion of which is selected from the group consisting of lower dialkylamino, 1-piperidyl, lower alkyl-1-piperidyl, 1-pyrrolidyl, lower alkyl-1-pyrrolidyl and 4-morpholinyl, and acid-addition salts thereof.

2. A compound having the formula

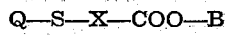

where Q is a 4-quinolyl radical, X is a lower alkylene radical, and B is a lower dialkylaminoalkyl group, and acid-addition salts thereof.

3. A compound having the formula

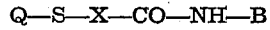

where Q is a 4-quinolyl radical, X is a lower alkylene radical, and B is a lower dialkylaminoalkyl group, and acid-addition salts thereof.

4. A compound having the formula

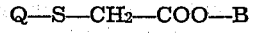

where Q is a 4-quinolyl radical and B is a lower dialkylaminoalkyl group, and acid-addition salts thereof.

5. A compound having the formula

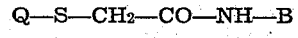

where Q is a 4-quinolyl radical and B is a lower dialkylaminoalkyl group, and acid-addition salts thereof.

6. The process of preparing a compound having the formula

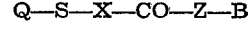

where Q is a 4-quinolyl radical, X is a lower alkylene radical, Z is a member of the group consisting of O, NH, and N-(lower alkyl), and B is a lower tertiary-aminoalkyl group, the tertiary-amino portion of which is selected from the group consisting of lower dialkylamino, 1-piperidyl, lower alkyl-1-piperidyl, 1-pyrrolidyl, lower alkyl-1-pyrrolidyl and 4-morpholinyl, which comprises reacting a compound of the formula, Q—S—X—COOR, where R is a lower alkyl group, with a compound of the formula, B—Z—H.

7. The process of preparing a compound having the formula

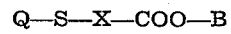

where Q is a 4-quinolyl radical, X is a lower alkylene radical, and B is a lower dialkylaminoalkyl group, which comprises reacting a compound of the formula, Q—S—X—COOR, where R is a lower alkyl group, with a compound of the formula, BOH.

8. The process of preparing a compound having the formula

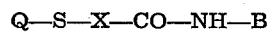

where Q is a 4-quinolyl radical, X is a lower alkylene radical, and B is a lower dialkylaminoalkyl group, which comprises reacting a compound of the formula, Q—S—X—COOR, where R is a lower alkyl group, with a compound of the formula BNH₂.

9. The process of preparing a compound having the formula

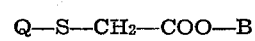

where Q is a 4-quinolyl radical and B is a lower dialkylaminoalkyl group, which comprises reacting a compound of the formula,

where R is a lower alkyl group, with a compound of the formula BOH.

10. The process of preparing a compound having the formula

Q—S—CH₂—CO—NH—B where Q is a 4-quinolyl radical and B is a lower dialkylaminoalkyl group, which comprises reacting a compound of the formula,

Q—S—CH₂—COOR where R is a lower alkyl group, with a compound having the formula BNH₂.

11. A compound having the formula

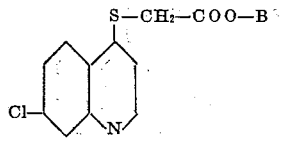

where B is a lower dialkylaminoalkyl group, and acid-addition salts thereof.

12. 2-diethylaminoethyl 7-chloro-4-quinolylmercaptoacetate, and acid-addition salts thereof.

13. 2-dimethylaminoethyl 7-chloro-4-quinolylmercaptoacetate, and acid-addition salts thereof.

14. 2-(1-piperidyl)ethyl 7-chloro-4-quinolylmercaptoacetate, and acid-addition salts thereof.

15. 2-(4-morpholinyl)ethyl 7-chloro-4-quinolylmercaptoacetate, and acid-addition salts thereof.

16. The process of preparing a compound having the formula

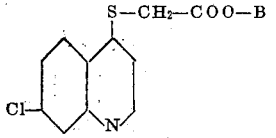

where B is a lower dialkylaminoalkyl group, which comprises reacting a lower alkyl 7-chloro-4-quinolylmercaptoacetate with a basic alcohol of the formula BOH.

17. The process of preparing 2-diethylaminoethyl 7-chloro-4-quinolylmercaptoacetate, which comprises reacting a lower alkyl 7-chloro-4-quinolylmercaptoacetate with 2-diethylaminoethanol.

18. The process of preparing 2-dimethylaminoethyl 7-chloro-4-quinolylmercaptoacetate, which comprises reacting a lower alkyl 7-chloro-4-quinolylmercaptoacetate with 2-dimethylaminoethanol.

19. The process of preparing 2-(1-piperidyl)ethyl 7-chloro-4-quinolylmercaptoacetate, which comprises reacting a lower alkyl 7-chloro-4-quinolylmercaptoacetate with 2-(1-piperidyl)ethanol.

20. The process of preparing 2-(4-morpholinyl)ethyl 7-chloro-4-quinolylmercaptoacetate, which comprises reacting a lower alkyl 7-chloro-4-quinolylmercaptoacetate with 2-(4-morpholinyl)ethanol.

ALEXANDER R. SURREY.

REFERENCES CITED

The following references are of record in the file of this patent:

UNITED STATES PATENTS

| Number | Name | Date |
|---|---|---|
| 1,825,623 | Miescher | Sept. 29, 1931 |
| 1,841,970 | Miescher | Jan. 19, 1932 |

OTHER REFERENCES

Wiselogle: "Survey of Antimalarial Drugs, 1941–1945" (J. W. Edwards; Ann Arbor, Mich.; 1946) vol. II, part 2, page 1058.

Steck: J. Am. Chem. Soc., vol. 68, page 129 (Jan. 1946).

Schonhofer: Zeit. physiol. Chem., vol. 274, pp. 1–8 (1942).